(12) United States Patent
Van Den Bosch et al.

(10) Patent No.: US 9,312,900 B2
(45) Date of Patent: Apr. 12, 2016

(54) ELECTRICAL TRANSCEIVER FOR SYNCHRONOUS ETHERNET

(71) Applicants:OPTO ELECTRONICS SOLUTIONS CO., LTD., Gwangju (KR); AIMVALLEY B.V., Hilversum (NL)

(72) Inventors: Willem Van Den Bosch, Hilversum (NL); Niels Schipper, Hilversum (NL)

(73) Assignees: OPTO ELECTRONICS SOLUTIONS CO., LTD., Gwangju (KR); AIMVALLEY B.V., Hilversum (NL)

( * ) Notice: Subject to any disclaimer, the term of this patent is extended or adjusted under 35 U.S.C. 154(b) by 0 days.

(21) Appl. No.: 14/516,995

(22) Filed: Oct. 17, 2014

(65) Prior Publication Data

US 2015/0110162 A1  Apr. 23, 2015

Related U.S. Application Data

(60) Provisional application No. 61/892,522, filed on Oct. 18, 2013.

(51) Int. Cl.
| | |
|---|---|
| *H04B 1/38* | (2015.01) |
| *H04L 12/40* | (2006.01) |
| *H04J 3/06* | (2006.01) |

(52) U.S. Cl.
CPC ............. *H04B 1/38* (2013.01); *H04J 3/0697* (2013.01); *H04L 12/40006* (2013.01); *H04J 3/0667* (2013.01); *H04J 3/0673* (2013.01)

(58) Field of Classification Search
CPC ...................................................... H04L 49/352
USPC .......................................................... 375/219
See application file for complete search history.

(56) References Cited

U.S. PATENT DOCUMENTS

| | | | |
|---|---|---|---|
| 2002/0089927 A1* | 7/2002 | Fischer et al. | 370/229 |
| 2002/0089959 A1* | 7/2002 | Fischer et al. | 370/338 |
| 2002/0089994 A1* | 7/2002 | Leach, Jr. et al. | 370/412 |
| 2002/0176416 A1* | 11/2002 | Ben-Ze'ev et al. | 370/389 |
| 2012/0057622 A1* | 3/2012 | Kimura et al. | 375/219 |
| 2013/0077642 A1* | 3/2013 | Webb et al. | 370/503 |
| 2013/0242283 A1* | 9/2013 | Bailey et al. | 356/4.01 |
| 2014/0119148 A1* | 5/2014 | Earle | 365/230.02 |
| 2014/0192797 A1* | 7/2014 | Licardie et al. | 370/350 |

* cited by examiner

*Primary Examiner* — Santiago Garcia
(74) *Attorney, Agent, or Firm* — Ladas & Parry LLP

(57) ABSTRACT

Disclosed is an electrical transceiver for synchronous Ethernet, including: a first interface connected with a host; a second interface including a physical layer (PHY) transceiver connected with a serial link; and a processor connected with the first interface and the second interface, wherein the processor includes a timing control unit controlling a transmission signal transmitted to the second interface from the first interface and a reception signal transmitted to the first interface from the second interface to have the same time delay.

7 Claims, 2 Drawing Sheets

ELECTRICAL TRANSCEIVER FOR SYNCHRONOUS ETHERNET

BACKGROUND OF THE INVENTION

1. Field of the Invention

The present invention relates to an electrical transceiver for synchronous Ethernet.

2. Background Art

Most commercialized electrical transceivers cannot support a synchronous Ethernet function at present. Some transceivers operate in a slave mode to support synchronous Ethernet, but receive a synchronous signal, but a transceiver that operates in a master mode to transmit and receive the synchronous signal has not yet been available. Further, when the electrical transceiver operates in the master mode between two IEEE 1588 nodes, a delay of a signal transmitted to a serial link (copper cable) from a host and a delay of a signal received in the host from the serial link are not the same as each other, and as a result, a time synchronization error occurs.

SUMMARY OF THE INVENTION

The present invention has been made in an effort to provide an electrical transceiver that supports not only a master mode or a slave mode in synchronous Ethernet by matching time delays of a reception signal received to a host from a serial link and a transmission signal transmitted to the serial link from the host, but also IEEE 1588 time synchronization.

An exemplary embodiment of the present invention provides an electrical transceiver for synchronous Ethernet, including: a first interface connected with a host; a second interface including a physical layer (PHY) transceiver connected with a serial link; and a processor connected with the first interface and the second interface, wherein the processor includes a timing control unit controlling a transmission signal transmitted to the second interface from the first interface and a reception signal transmitted to the first interface from the second interface to have the same time delay.

The serial link may be a 10/100/1000Base-T copper cable.

The processor may include a decoding unit decoding a line coding signal received from the host, an encoding unit encoding the signal received from the serial link to the line coding signal, and a physical layer (PHY) interface connected with the physical layer (PHY) transceiver.

The processor may convert a 1.25 gigabit Ethernet serial packet signal to a 10/100/1000 Base-T line signal, and convert the 10/100/1000 Base-T line signal to the 1.25 gigabit Ethernet serial packet signal.

The timing control unit may include a first buffer disposed between the decoding unit and the second interface, and a second buffer disposed between the second interface and the encoding unit.

The timing control unit may include a delay control unit that controls buffering speeds of the first buffer and/or the second buffer so that the transmission signal and the reception signal have the same time delay.

The decoding unit may decode an 8b10b line coding signal to an 8-bit signal, and the encoding unit may encode the 8-bit signal to the 8b10b line coding signal.

The electrical transceiver may further include: a first PLL transmitting a transmission clock signal extracted from the signal transmitted from the host to the optical physical layer (PHY) transceiver; and a second PLL transmitting a received clock signal extracted from the signal transmitted from the serial link to the encoding unit.

Delays of the transmission signal and the reception signal may match each other by Equation 1 below.

$$\{\text{fixed}\_{RX}\_\text{serdes} + [n] \times 8 \text{ ns} + \text{fixed}\_{TX}\_\text{PHY}\} = \{\text{fixed}\_{TX}\_\text{serdes} + \text{fixed}\_{EQ}\_\text{delay} + \text{fixed}\_{RX}\_\text{PHY}\} \quad [\text{Equation 1}]$$

wherein fixed_RX_serdes may represent a delay rate of the encoding unit, fixed_TX_PHY may represent a delay rate of a transmission unit in the physical layer (PHY) transceiver, fixed_TX_serdes may represent a delay rate of the decoding unit, fixed_EQ_delay may represent a delay rate in the timing control unit, and fixed_RX_PHY may represent a delay rate of a reception unit in the physical layer (PHY) transceiver, and [n] may represent a constant.

BRIEF DESCRIPTION OF THE DRAWINGS

In order to more clarify the above advantages and features and other advantages and features of the present invention, the present invention will be described in more detail with reference to specific exemplary embodiments illustrated in the accompanying drawings. The drawings just show representative exemplary embodiments of the present invention, and as a result, it should not be considered that the drawings limit the scope of the present invention. The present invention will be described and explained together with additional peculiarities and detailed contents by using the accompanying drawings.

DETAILED DESCRIPTION OF THE PREFERRED EMBODIMENT

Figure 1:
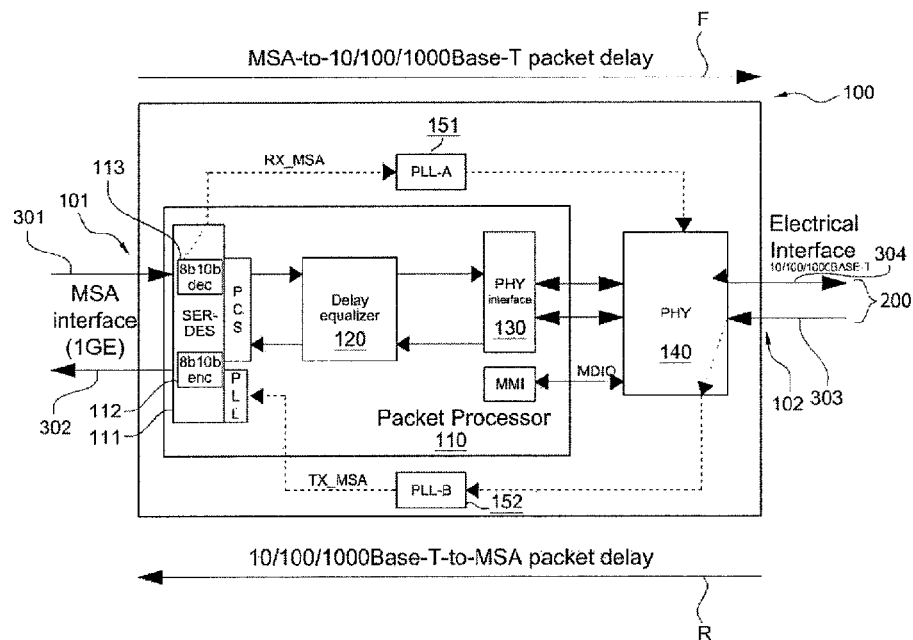
FIG. 1 is a block diagram of a transceiver according to an exemplary embodiment of the present invention.

The present invention may have various modifications and various exemplary embodiments and specific exemplary embodiments will be illustrated in the drawings and described. However, this is not intended to limit the present invention to the specific exemplary embodiments, and it should be understood that the present invention covers all the modifications, equivalents and replacements included in the spirit and technical scope of the present invention.

Terms including an ordinal number such as first or second may be used to describe various components but the components are not limited by the above terms. The above terms are used only to discriminate one component from another component. For example, without departing from the scope of the present invention, a second component may be referred to as a first component, and similarly, the first component may be referred to as the second component. The term "and/or" includes a combination of a plurality of associated disclosed items or any item of the plurality of associated disclosed items.

It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Terms used in the present application are used only to describe specific exemplary embodiments, and are not intended to limit the present invention. Singular expressions used herein include plurals expressions unless they have definitely opposite meanings in the context. In the present application it should be understood that the term "include" or "have indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless otherwise defined, all terms used herein including technological or scientific terms have the same meanings as those generally understood by a person with ordinary skill in the art to which the present invention pertains. It should be understood that terms defined in a generally used dictionary have the same meanings as contextual meanings of associated techniques and if not apparently defined in this application, the terms shall not be construed in ideal or excessively formal meanings.

Hereinafter, exemplary embodiments of the present invention will be described in detail with reference to the accompanying drawings, in which like reference numerals refer to like or similar elements regardless of reference numerals and a duplicated description thereof will be omitted.

Figure 2:
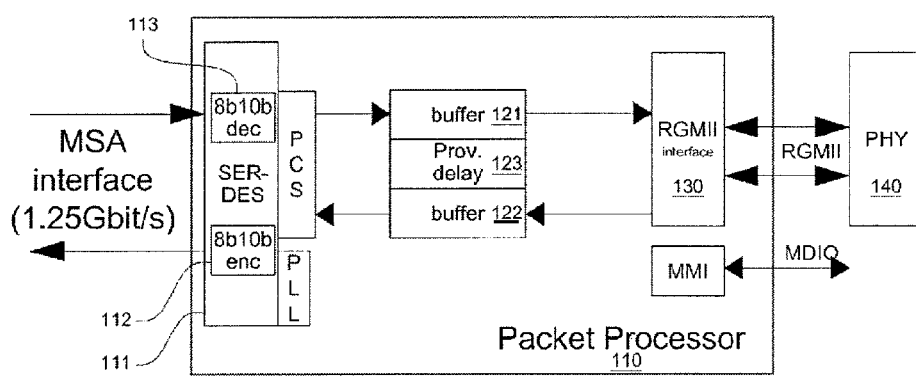
FIG. 2 is a block diagram of a processor according to the exemplary embodiment of the present invention.
Figure 3:
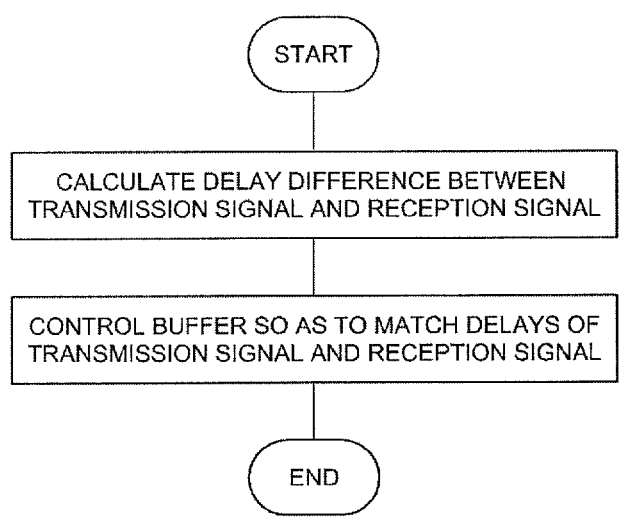
FIG. 3 is a flowchart for describing a process of matching time delays of a transmission signal and a reception signal according to another exemplary embodiment of the present invention.

FIG. 1 is a block diagram of a transceiver according to an exemplary embodiment of the present invention. FIG. 2 is a block diagram of a processor according to the exemplary embodiment of the present invention.

Referring to FIG. 1, the electrical transceiver 100 includes a first interface 101 connected with a host, a second interface 102 including a physical layer (PHY) transceiver 140 connected with a serial link 200, and a processor 110 connected with the first interface 101 and the second interface 102. The first interface 101 and the second interface 102 may be electrical interfaces.

The processor 110 includes a serial/parallel converter (Serdes/PCS) 111 that communicates with the host through the first interface 101 and a physical layer interface 130 connected with the physical layer (PHY) transceiver 140. The first interface 101 may be a multi-source agreement (MSA) interface and the second interface 102 includes the physical layer (PHY) transceiver 140 connected with a copper link of 10/100/1000base-T.

The serial/parallel converter 111 includes a decoding unit 113 that decodes a line coding signal that is input from the host and an encoding unit 112 that encodes a signal input from the serial link 200 to the line coding signal.

The decoding unit 113 receives a 1.25 gigabit Ethernet serial packet signal 301 input from the host to decode an 8B10B line coded signal to an 8-bit signal.

The encoding unit 112 receives an 8-bit signal (10Base-T, 100Base-T, or 1000Base-T line signal) 304 input from the serial link and encodes the received 8-bit signal to the 8B10B line coding signal, and transfers a packet signal 302 to the host through the first interface 101.

The physical layer interface 130 transmits the decoded signal to the physical layer (PHY) transceiver 140 or receives the signal from the physical layer (PHY) transceiver 140 and transmits the received signal to the encoding unit 112. The physical layer interface 130 may be a reduced gigabit media independent interface (RGMII). However, the physical layer interface 130 is not limited thereto but may be a media independent interface (MII) or a gigabit media independent interface (GMII).

When the transceiver 100 is in a master mode, the processor 110 extracts transmission clock information from the 1.25 gigabit Ethernet serial packet signal and a first phase locked loop (PLL) 151 transmits the extracted transmission clock information to the physical layer (PHY) transceiver 140. Further, the clock information extracted from the 10Base-T, 100Base-T, or 1000Base-T line signal received from the serial link 200 is transmitted to the encoding unit 112 by a second PLL 152.

When the electrical transceiver 100 is in a slave mode, a configuration of the first PLL 151 is omitted and the clock information extracted from the 10Base-T, 100Base-T, or 1000Base-T line signal received from the serial link 200 is transmitted to the encoding unit 112 by the second PLL 152.

The physical layer (PHY) transceiver 140 transmits the decoded signal and the transmission clock information to the serial link 200 or receives a data signal 303 from the serial link 200 or extracts the clock information and transmits the received data signal 303 or clock information to the physical layer interface 130. A transmission speed from the serial link 200 is any one speed of 10base-T, 100base-T, and 1000base-T.

The physical layer (PHY) transceiver 140 causes time delays at the time of transmitting the decoded signal to the serial link 200 and of receiving the signal from the link. The time delays are caused from various mechanical, electrical, functional, and procedural problems at the time of transmitting and receiving the signal from the physical layer (PHY) transceiver 140. A difference between the delays varies depending on the size of the packet or the number of the packets.

Therefore, the delay of the signal transmitted to the serial link 200 from the host and the delay of the signal received to the host from the serial link 200 are not the same as each other, and as a result, a time error occurs. The processor 110 according to the present invention includes a timing control unit (delay equalizer) 120 controlling a transmission signal F transmitted to the second interface 102 from the first interface 101 and a reception signal R transmitted to the first interface 101 from the second interface 102 to have the same time delay.

The timing control unit 120 includes a first buffer 121 disposed between the decoding unit 113 and the second interface 102, a second buffer 122 disposed between the second interface 102 and the encoding unit 112, and a delay control unit (Prov. delay) 123 controlling the first buffer 121 and/or the second buffer 122 so that the transmission signal F and the reception signal R match each other.

The delay difference between the transmission signal F and the reception signal R may be calculated by an experiment and a delay value to compensate for the calculated difference may be inserted into the delay control unit 123. Therefore, buffering speeds of the first buffer 121 and the second buffer 122 are controlled by the delay control unit 123, so as to match the delays of the transmission signal F and the reception signal R.

In detail, the delay difference between the transmission signal and the reception signal may be calculated by Equation 1 below.

$$\{\text{fixed\_}RX\text{\_serdes} + [n] \times 8 \text{ ns} + \text{fixed\_}TX\text{\_PHY}\} = \{\text{fixed\_}TX\text{\_serdes} + \text{fixed\_}EQ\text{\_delay} + \text{fixed\_}RX\text{\_PHY}\} \quad \text{[Equation 1]}$$

Herein, fixed_RX_serdes represents a delay rate (alternatively, transmission rate) of the encoding unit 112 in the serial/parallel converter, fixed_TX_PHY represents a delay rate of a transmission unit in the physical layer (PHY) transceiver 140, fixed_TX_serdes represents a delay rate of the decoding unit 113 in the serial/parallel converter, fixed_EQ_delay represents a delay rate in the timing control unit 120, and fixed_RX_PHY represents a delay of a reception unit in the physical layer (PHY) transceiver 140. In this case, a transmission/reception delay of the serial/parallel converter 111 and a transmission/reception delay of the physical layer (PHY) transceiver 140 may be experimentally calculated.

Therefore, values of a left term and a right term are calculated in Equation 1 are determined, and as a result, the delay difference between the transmission signal and the reception signal may be calculated (S10). Thereafter, a value of [n] at which the delays of the transmission signal and the reception signal are the same as each other is calculated and a delay speed of the buffer is controlled according to the value (S20) to match the delays of the transmission signal and the reception signal. The delay speed of the buffer may be controlled by 8 ns (nano second) steps.

According to such a configuration, since the delays of the transmission signal F and the reception signal R match each other, all packets have the same delay and are transmitted bidirectionally. Therefore, the time error is removed.

According to the present invention, the electrical transceiver that is connected to the 10/100/1000Base-T serial link to operate may support the synchronous Ethernet function in each of the master mode and the slave mode.

According to the present invention, since the transmission delays are the same as each other bidirectionally, an IEEE1588 time synchronization packet (precision time protocol (PTP)) can be transmitted without the time error (time of day degradation)

According to the present invention, even though not an optical transceiver but the electrical transceiver is used, time synchronization of an Ethernet network may be maintained.

According to the present invention, since the electrical transceiver supports the synchronous Ethernet, the electrical transceiver may be directly connected with a system including an electrical interface, and as a result, a separate photoelectric conversion interface need not be constructed midway, thereby decreasing facility investment cost (CAPEX). According to the present invention, since the transceiver is inserted into an optical cage, a separate dedicated card is not required and low power consumption saves operation cost by a user.

The term "~unit" used in the exemplary embodiment means a software or hardware component such as a field-programmable gate array (FPGA) or ASIC, and "~unit" performs predetermined roles. However, "~unit" does not have a meaning limited to software or hardware. "~unit" may be configured to be positioned in an addressable storage medium and configured to replay one or more processors. Therefore, as one example, "~unit" may include components such as software components, object oriented software components, class components, and task components, processes, functions, attributes, procedures, subroutines, segments of a program code, drivers, firmware, a microcode, a circuit, data, a database, data structures, tables, arrays, and variables. Functions provided in the components and "~units" may be joined as a smaller number of components and "~units" or further separated into additional components and "~units". In addition, the components and "~units" may be implemented to replay one or more CPUs within a device or a security multimedia card.

The present invention has been described in detail with reference to preferred embodiments thereof. However, it will be appreciated by those skilled in the art that various modifications and changes may be made in these embodiments without departing from the spirit and the scope of the invention which is defined in the appended claims.

What is claimed is:

1. An electrical transceiver for synchronous Ethernet comprising:
a first interface connected with a host;
a second interface including a physical layer (PHY) transceiver connected with a serial link; and
a processor connected with the first interface and the second interface,
wherein the processor includes a timing control unit controlling a transmission signal transmitted to the second interface from the first interface and a reception signal transmitted to the first interface from the second interface to have the same time delay, a decoding unit decoding a line coding signal received from the host and an encoding unit encoding the signal received from the serial link to the line coding signal,
wherein a delay difference between the transmission signal and the reception signal is calculated by Equation 1 below, $$\{\text{fixed RX serdes} + [n] \times 8\text{ns} + \text{fixed TX PHY}\} = \{\text{fixed TX serdes} + \text{fixed EQ delay} + \text{fixed RX PHY}\} \quad [\text{Equation 1}]$$

where, fixed RX serdes represents a delay time of the encoding unit, fixed TX PHY represents a delay time of a transmission unit in the physical layer (PHY) transceiver, fixed TX serdes represents a delay time of the decoding unit, fixed EQ delay represents a delay time in the timing control unit, and fixed RX PHY represents a delay time of a reception unit in the physical layer (PHY) transceiver, and [n] is a value at which the delays of the transmission signal and the reception signal are the same.

2. The electrical transceiver of claim 1, wherein the serial link is a 10/100/1000Base-T copper cable.

3. The electrical transceiver of claim 1, wherein:
the processor includes
a physical layer (PHY) interface connected with the physical layer (PHY) transceiver.

4. The electrical transceiver of claim 1, wherein the processor converts a 1.25 gigabit Ethernet serial packet signal to a 10/100/1000 Base-T line signal, and converts the 10/100/1000 Base-T line signal to the 1.25 gigabit Ethernet serial packet signal.

5. The electrical transceiver of claim 1, wherein
the timing control unit includes
a first buffer disposed between the decoding unit and the second interface, and
a second buffer disposed between the second interface and the encoding unit.

6. The electrical transceiver of claim 1, wherein: the decoding unit decodes an 8b10b line coding signal to a 8-bit signal, and the encoding unit encodes the 8-bit signal to the 8b10b line coding signal.

7. The electrical transceiver of claim 1, further comprising:
a first PLL transmitting a transmission clock signal extracted from the signal transmitted from the host to the physical layer (PHY) transceiver; and
a second PLL transmitting a received clock signal extracted from the signal transmitted from the serial link to the encoding unit.

* * * * *